July 10, 1928.
E. A. WHITE
FRUIT CLEANING APPARATUS
Filed Oct. 15, 1926
1,676,306
3 Sheets-Sheet 1
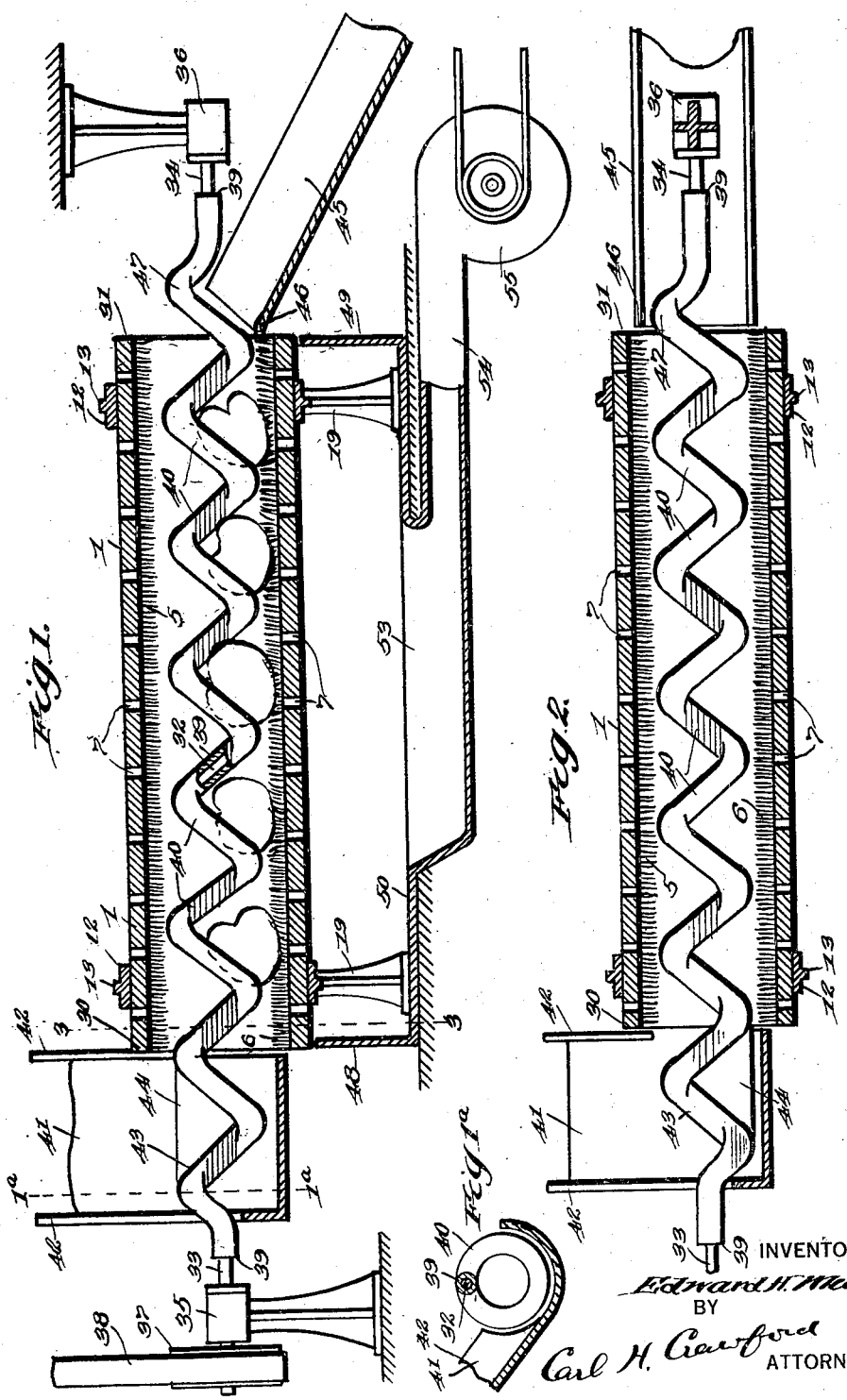
INVENTOR
Edward A. White
BY
Carl H. Crawford
ATTORNEY

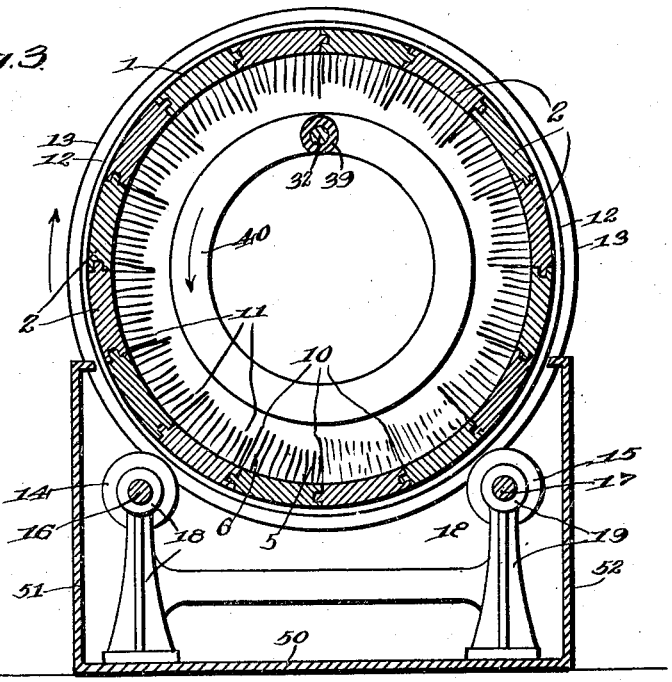
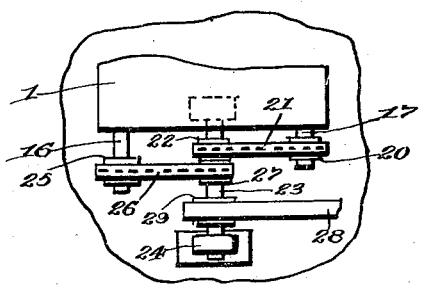
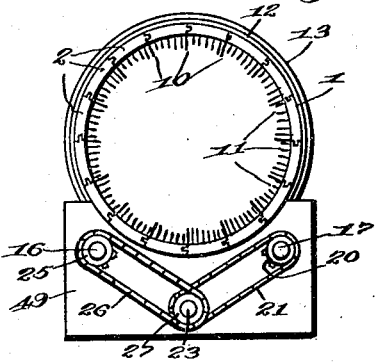
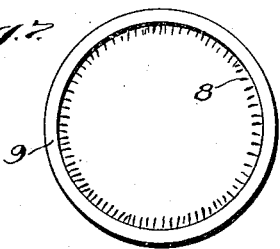
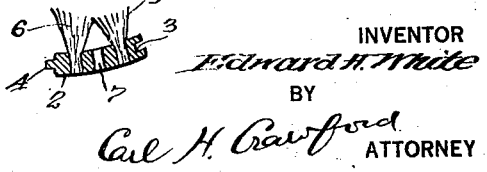

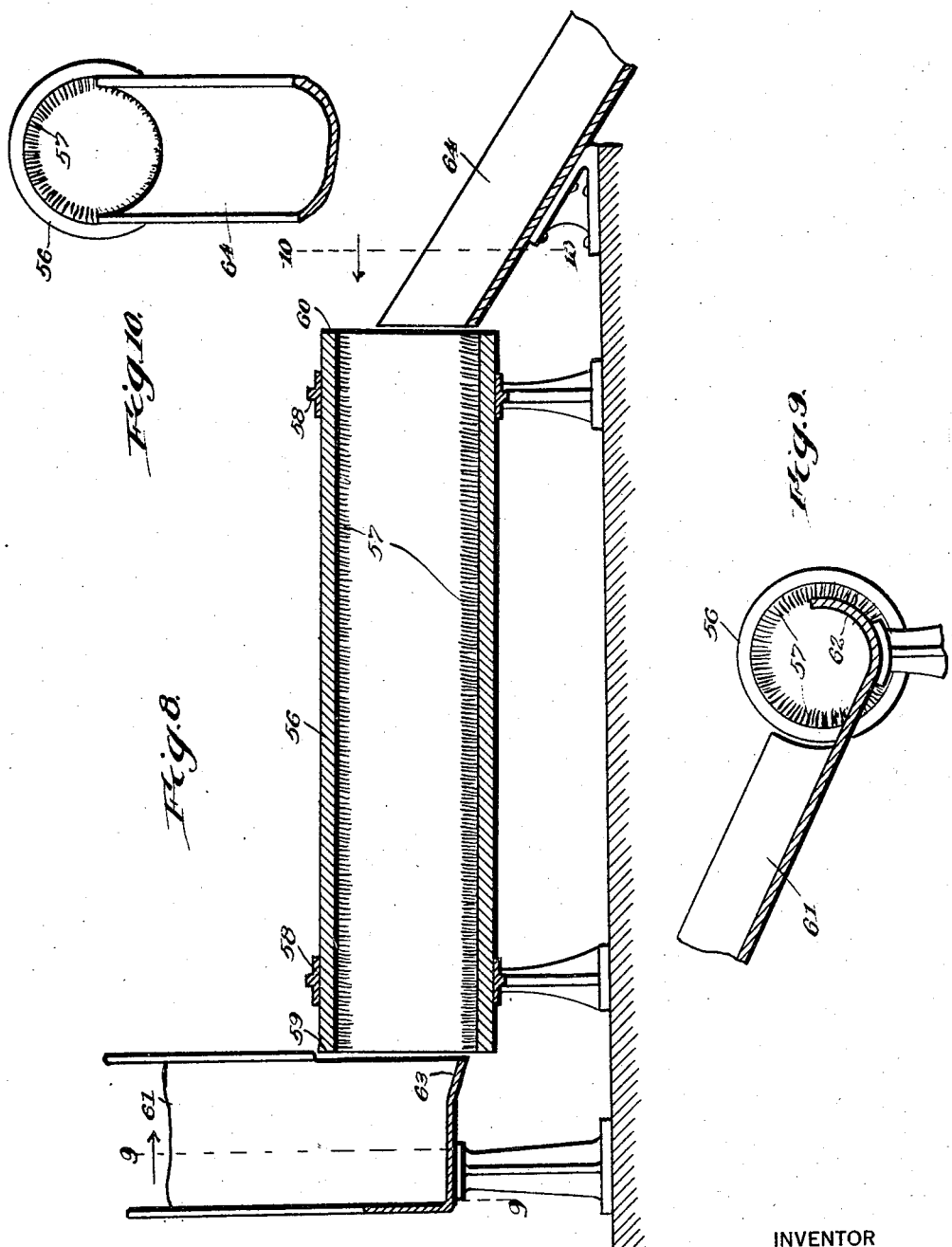

Patented July 10, 1928.

1,676,306

UNITED STATES PATENT OFFICE.

EDWARD A. WHITE, OF LEWISTON, IDAHO.

FRUIT-CLEANING APPARATUS.

Application filed October 15, 1926. Serial No. 141,746.

This invention relates to an improved method and means for cleaning fruit.

It is one of the objects of this invention to maintain the fruit entities in separated relation with respect to each other throughout the cleaning operation.

A further object of the invention is to support the fruit on a concave cleaning surface of such resiliency that the combined effect of the character of the surface and the shape thereof will result in a relatively greater area of the fruit being subjected to the cleaning action.

A further object is to provide a cleaning body of hollow construction, preferably cylindrical, the interior of which is provided with a cleaning lining preferably of a bristle nature, and the body being set in motion to obtain such relative movement of the cleaning surfaces with respect to the fruit as to remove from the surface thereof any foreign matter.

In the most improved form of the invention, I provide a novel form of means for advancing the fruit along the cleaning surface, and preferably, such means will impart a movement to the fruit while advancing the same, which is of an additional or different character from the movement imparted to said fruit by the motion of the cleaning body.

It will thus be seen that in the most improved form of my invention, the same includes a cleaning element and an advancing element, and it is a special feature of my invention to so construct the same that the cleaning element may be made of relatively small size but rendered relatively great in capacity by being actuated at a relatively high rate of speed while the advancing element is actuated at a relatively slow rate of speed, the advancing element functioning to in all respects control the movement of the fruit and maintain the fruit entities in separated relation irrespective of the rolling or moving action of the fruit under the influence of the relatively different speeds of the cleaning and advancing elements.

It is a further feature of my invention to subject the cleaning surface to such an effective air draft that as foreign matter is removed from the surface of the fruit to the cleaning surface, it will rapidly be removed from the latter and be withdrawn to a point remote from the machine thereby rendering the cleaning surface at all time efficient to a maximum degree.

My invention also includes a novel form of advancing device which is broadly of a screw-like form and preferably in the form of a spiral of rod-like cross section, a special feature being that the spiral always presents a soft smooth surface to the fruit.

My invention has many other features and advantages which will be more fully described in connection with the accompanying drawings and which will be more particularly pointed out in and by the appended claims.

In the drawings:

Fig. 1, is a vertical longitudinal sectional view of the most improved form of my invention.

Fig. 1ª is a view on line 1ª—1ª of Fig. 1.

Fig. 2, is a horizontal longitudinal sectional view thereof.

Fig. 3, is a vertical sectional view on an enlarged scale taken on line 3—3 of Fig. 1.

Fig. 4, is a plan view of one end of the machine showing the manner of driving the cleaning cylinder.

Fig. 5, is an end view thereof.

Fig. 6, is a sectional view of one of the staves detached from the cylinder.

Fig. 7, is an end view on a smaller scale showing the cylinder equipped with a brush of a cylindrical perimeter.

Fig. 8, is a longitudinal sectional view of a modified form of my invention with the advancing device omitted.

Fig. 9, is a sectional view on line 9—9 of Fig. 8, looking toward the right.

Fig. 10, is a sectional view on line 10—10 of Fig. 8, looking toward the left.

Like characters of reference designate similar parts throughout the different figures of the drawings.

In the form illustrated, and referring more particularly to Figs. 1 to 7, my machine embodies an improved cleaning element generally indicated at 1, and which is in the form of a hollow body and preferably cylindrical in form. I consider it a novel feature to construct said body or shell 1 of a plurality of joined staves 2, the same being shown provided with laterally disposed mortice and tenon interfitting parts 3 and 4. Said body 1 is provided with an improved cleaning surface which, in the present construction, is formed of tufts or bristles 5 and 6, disposed in rows on each stave. As will be seen in Fig. 6, these tufts are inserted in the stave 2, in a manner to project radially inwardly of the cylindrical body 1, or in other words, they are secured to the inner face of said body, which is the concave face thereof. It will be readily seen that the taper of the bristle tufts is such that the spread of the latter at their free ends will insure continuous contact of said ends thereby providing a continuous cleaning or brush surface. This spread of the outer or free ends of said tufts, not only insures a continuity of brush surface transversely but also longitudinally whereby the fruit will always be engaged thereby.

At suitable points intermediate the anchorage of the bristle tufts 5 and 6, I provide the staves with air passage openings 7, for passage of a bristle cleaning air blast that will be later described. It will be seen that the disposition of the openings 7 is so advantageously arranged as to insure a most intimate coaction between a sustained current of air and the bristles, as will be more fully described later on.

While I do not wish to be limited to the stave construction of the body 1, still, I find in practice that this construction lends itself most readily to the general purpose of the machine and greatly reduces the cost of constructing a hollow body with an internal lining of a cleaning nature.

While in some forms of the invention I will use tufts of bristles of uniform length so that the internal diameter of cleaning surface will be uniformly concentric with the diameter of the body 1, as in Fig. 7, where the bristles are designated at 8, and where the body 9 is not sectional, still, this will be modified in other forms. The form shown in Fig. 7, is advantageous where accumulations of foreign matter on the fruit is not excessive, and it may also have the advantage of greater wearing qualities, or at best, a more even distribution of wear, in some cases.

I will next describe a bristle construction that is particularlly designed and adapted for use where accumulations of foreign matter on the fruit is excessive and where, in any event, it is desired to very effectively clean out the cavities constituting the stem and blossom ends of the fruit, as would be the case with apples, for instance.

As shown, each stave has rows of tufts of unequal length, and as shown in Fig. 6, the tufts 5 and 6 present inner surfaces that are arcuate, or generally speaking, eccentric to the cylinder 1. Hence, a plurality of relatively sharply defined longitudinally disposed edges 10, would be successively presented to the fruit, as shown in Fig. 3. I preferably increase the cleaning action of these edges, which of course are flexible and non-injurious, by rotating the body 1 in a clockwise direction, viewing Fig. 3, thereby causing said projection portions 10 to engage the fruit in advance of the radially outer or more concave portions 11. At any rate, instead of the cleaning surface presenting a uniform area to the fruit, it will present an alternately projecting and retracted surface whereby a most efficient action will result.

I will next describe one manner of mounting the cleaning body 1 and imparting motion thereto.

As shown, said body is provided with a pair of annular tracks 12 having flanges 13, suitably secured to said body 1. Rollers, preferably driving and supporting rollers, are disposed in pairs, one pair 14 and 15 being shown in Fig. 3, one pair for each of said tracks 12. Said rollers are shown mounted on shafts 16 and 17, which are journalled in bearings 18 and 19. Shaft 17, is provided with a sprocket wheel 20, over which a sprocket chain 21 is trained, the remaining bight thereof being trained over a driving sprocket 22, on a driving shaft 23, suitably journaled in bearings 24, one only being shown, in Fig. 4. Shaft 16 has a sprocket 25, over which a chain 26, is trained, said chain also being trained over a driving sprocket 27, on shaft 23, which latter may be driven by any form of belt 28, trained over wheel 29. I have shown arrows illustrating the direction in which drive is imparted. The speed of rotation of cylinder 1, will depend upon its length, and upon various conditions attending the nature of fruit to be cleaned and its condition. However, the rate of speed of rotation will be a relatively low speed. If it is found desirable, the track can be a toothed track and the driving and supporting wheels can be toothed wheels, but this is not a matter of importance.

Viewing Fig. 1, the ingress end 30, is mounted on said rollers 14 and 15 so as to be at a slightly lower elevation than egress end 31, the degree of slant or incline being un-important. This prevents a too rapid advance of the fruit in the cylinder and affords other advantages.

I will next describe an improved means for advancing and controlling the movement of the fruit through said cylinder from the ingress to the egress end thereof.

The means employed, rotates about a longitudinal axis within the cylinder and the form is screw-like and preferably spiral, the axial portion being open and the engagement of the means with the fruit being peripheral or along the periphery of said means. I have shown a spiral advancer which may be formed of a rod or pipe 32, the same having axially disposed bearing ends 33 and 34, the former being journalled in a bearing 35, and the latter in a bearing 36. The bearing 35, is an upright bearing but the bearing 36, is shown pendent in order to afford space for discharge means for the egress end 31. I have shown a pulley 37, on the end 33, about which a belt 38, is trained, to impart rotatory motion to the advancer. In the preferred form, the advancer is rotated in a contra-clockwise direction, viewing Fig. 3, while the cylinder 1 is rotated in a clockwise direction, viewing said figure. The purpose of this is to cause the advancer to impart a rolling motion to the fruit as the latter is advanced, the rolling motion imparted by the advancer being opposite to the rolling motion imparted by the cylinder 1. Thus, the peripheral surface of the fruit entities is more rapidly and thoroughly brought into contact with the cleaning surface.

In order to render the advancer non-injurious to the fruit, I enclose the rod 32, with rubber or other soft or yielding material 39, as shown. With further reference to the advancer, it will be seen that the same is shaped to form a series of convolutions 40, the diameter of which is only slightly less than the internal diameter of the cylinder 1. Further, the convolutions 40 have a spread sufficient to more than accommodate the largest size fruit entities therebetween, as clearly shown in Fig. 1. It will be noted that the convolution also keep the fruit entities in separated relation and this is a vastly important feature since this provision not only avoids rubbing and consequent burning of the fruit, but it additionally prevents stem puncture, in the case of apples, for instance. In the form shown, the spiral advancer rotates about a horizontal axis while the cylinder rotates about an axis inclined to the horizontal, as shown. However, it will be clear that the two rotate about axes relatively angular to each other.

I will next describe the manner in which fruit is fed into the ingress end of the cylinder 1.

It will be noted that the convolutions extend through and beyond the ingress end 30 and I employ a feed trough 41, having side walls 42, the trough being of the general form shown in Fig. 1ª wherein it will be seen that the trough curves around and below the feeder portion 43, of the convolutions so that as the entities roll down, they actually roll into at least one of the feeder convolutions 43 and are advanced thereby into the cylinder 1. If desired, and in order to prevent more than one entity from entering the convolution at a time, in fruit of indiscriminate grade of size, I may equip one, or rather adjacent convolutions with a closing strip 44, as clearly shown in Fig. 1. This, or broadly means of a general character like it, will answer the purpose.

I will next describe the manner in which the fruit is axially discharged from the egress end 31.

At said egress end, I employ a trough 45 which is preferably inclined downwardly, as shown, and the intake end 46, is closely adjacent the egress end 31, of cylinder 1. A discharge convolution 47, extends far enough through the end of cylinder 1, to advance the fruit into said trough wherein the fruit descends by gravity. It will be clear that I have shown an advancing device which not only advances the fruit through the cylinder 1, but into and out of the same.

In Fig. 7, I have shown an end view of a cylinder in which the brush or other cleaning surface 8, is concentric with the cylinder, as hereinbefore explained.

Before describing the operation of my device, I will next refer to an improved method and manner of cleaning the brush surface so as to prevent accumulations of foreign matter from adhering to the fruit as the latter is advanced.

The cylinder 1, is partly subjacently enclosed by a housing having end walls 48 and 49, a bottom wall 50, and side walls 51 and 52. The latter extend upwardly about the periphery and, as shown, enclose the shafts 16 and 17, and parts appurtenant thereto. The bottom wall has an air egress opening 53, and a pipe 54, leads therefrom to a suction fan or like means 55 for causing a sustained current of air to flow through the holes 7, and down into said housing and out through said fan. Of course air will be also taken in through the ends of cylinder 1, but in any event, those openings 7, which are lowermost, or between walls 51 and 52, will convey an effective draft of air through the brushes such as will clear the latter from accumulations of dirt, dust, poison residue and other foreign matter that would otherwise be caught up by the fruit itself. It will thus be seen, that as the cylinder revolves, all the bristles thereof will at some time be subjected to this air current and hence the bristles will remain relatively clean.

I will next describe the modified form shown in Figs. 8, 9 and 10:

In this form, I employ a cleaning cylinder 56, which may be in all respects like the form shown in either Figs. 1 or 7, the same having a lining of cleaning material such as a continuous brush 57. I provide the cylinder 56 with annular tracks 58 adapted to be supported on driving rollers the same as in Fig. 1, but in this instance, the cylinder is inclined downwardly from its intake or ingress end 59 toward its egress end 60. I have not thought it necessary to show the air cleaning feature illustrated in Fig. 1, as it may or may not be used in this form or in any event, notwithstanding its obvious advantages.

At the ingress end 59, I provide a trough 61 which is downwardly inclined and terminates in a delivery end 62, which is shaped to deliver the fruit axially of the cylinder. It will be seen from Fig. 8, that the bottom wall 63, of the delivery end is suitably inclined toward the cylinder 56.

At the egress end 60, I provide a trough 64 which is adapted to receive the fruit as it is discharged from the cylinder, as will be clear by reference to Figs. 8 and 10.

Now in this form of the invention, I do not employ any advancing means for propelling the fruit through the cylinder 56, the slight incline being sufficient, for this purpose.

Reverting now to the operation of the preferred form it will be seen that as soon as the fruit entities enter the cylinder 1, they are subjected to a rolling action from the latter, and in practice, I find it advantageous to rotate the cylinder 1, at a very much more rapid rate than the advancer is rotated. By doing this, I can make the cylinder correspondingly shorter, and yet obtain not only a highly efficient cleaning action but also a larger capacity. I find it best to rotate the advancer just fast enough to supply the cleaned fruit as rapidly as it can be taken care of by the crew. Thus it will be seen that my improved advancer is also a controller as the advancer may be rotated or operated at a relatively slow speed while the cylinder is operated at a relatively high speed. Irrespective of the difference of speed at which the two are driven, the fruit is subjected to a reverse rolling action by each of these agencies and consequently the peripheries of the fruit are the more rapidly and thoroughly brought into engagement with the cleaning brushes.

In either of the forms shown, the cleaning lining is relatively soft and resilient so that the weight of the fruit entities will cause the latter to sink into the lining, and if the latter is formed of bristles, the same will be flexed by the weight of the fruit in a manner to impart an ideal wiping action. Further, it will be noted that a relatively larger area of the fruit will be wiped by reason of the fact that the cleaning surface is concave, it being clear that the fruit will sink farther into a flexible concave surface than it would into a flexible convex surface. It will also be seen that throughout the cleaning process, the fruit is confined by an enclosing body, namely, the cylinder 1.

As regards the air draft device, it will be noted that it is subjacently disposed and therefore acts in consonance with gravity, the foreign particles naturally falling to the bottom and into the downwardly passing currents of air. Further, suppose some syrupy, gummy or sap-like substance should have accumulated on the fruit and was transferred to the bristles. In that event, the rapidly passing air current would soon dry such substance so that it would soon be withdrawn just as easily as particles of poison sediment.

It is believed that the invention will be clearly understood from the foregoing description and I do not wish to be limited thereto except for such limitations as the claims may import.

I claim:

1. A fruit cleaning machine, comprising, a shell having an interior fruit cleaning surface, and a spiral feeder therein having peripherally disposed convolutions axially open to permit the fruit entities to project radially into the interior of said spiral feeder while the entities are being advanced thereby.

2. A fruit cleaning machine, comprising, a rotating cylindrical cleaning shell having an internal, resilient cleaning surface adapted to support the fruit in full floating relation on the lower portion of said surface, the diameter of said surface being substantially and slightly greater than the largest sized entitiy to be cleaned, and a rod-like spiral feeder substantially coextensive in diameter with respect to the diameter of said cleaning surface and the lower portions of the convolutions of said feeder engaging the fruit entities and floatingly advancing the latter longitudinally along the interior of said shell.

3. A fruit cleaning machine, comprising, a hollow rotating body provided with an interior fruit cleaning brush surface and having a plurality of radial openings extending therethrough, means for advancing fruit through said body while the latter is rotating, to clean the fruit, an air casing partly enclosing a peripheral portion of said body, and suction means connected with said casing for initiating a sustained air current through said openings and brush surface while said body is rotating.

In testimony that I claim the foregoing as my own, I hereby affix my signature.

EDWARD A. WHITE.